United States Patent Office 3,485,283
Patented Dec. 23, 1969

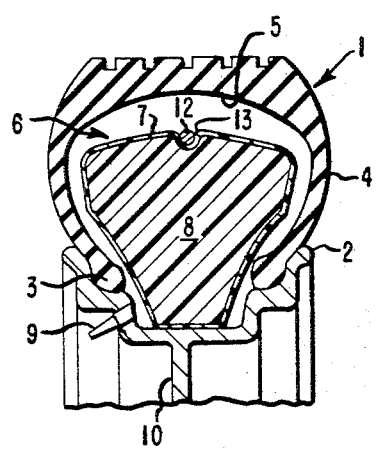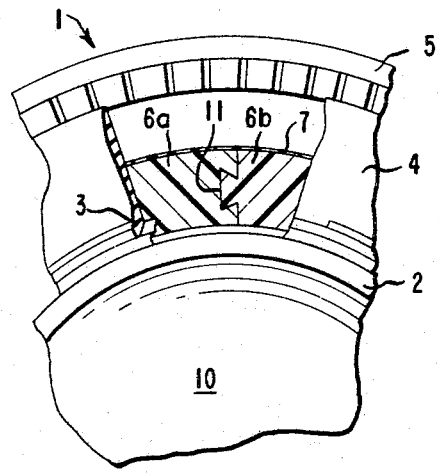

3,485,283
EMERGENCY SUPPORT FOR PNEUMATIC TIRES
Thorwill Brehmer, West Chester, Pa., and Chester M. Pomeroy, Wycliffe, Del., assignors to E. I. du Pont de Nemours and Company, Wilmington, Del., a corporation of Delaware
Filed Dec. 19, 1967, Ser. No. 691,906
Int. Cl. B60c 5/12
U.S. Cl. 152—158                6 Claims

ABSTRACT OF THE DISCLOSURE

An emergency support for use with a tubeless pneumatic tire composed of an annular polylactam body mounted on a wheel rim and composed of foamed polylactam, e.g. polycaprolactam, having closed cells and a tensile strength expressed by the formula $S_t \geq 20d^{1.45}$ wherein $S_t$ represents tensile strength, and $d$ represents density and has a value of from 3 to 15 pounds per cubic foot.

BACKGROUND OF THE INVENTION

This invention relates to an emergency support for use with a tubeless pneumatic tire, being adapted to provide support for the wheel and the tire when the tire becomes fully or partially deflated and thus to protect the moving vehicle against the danger normally incident to tire puncture or blowout, and to permit the moving vehicle to be brought to a halt after such tire deflation without loss of control of the vehicle by the operator.

The inconvenience, expense, and hazard created by unexpected and unplanned release of pressurized air from a pneumatic tire, especially on a moving vehicle, have long been recognized. Air pressure may be lost gradually through defective seals between tire and wheel rim and between valve stem and wheel rim, through defective valves or through small perforations. Even more critical is the sudden or catastrophic loss of air pressure through a large puncture or cut in the tire, or by blowing out the side wall of the tire, bringing with it the hazard created by running a tire off the rim or by the driver's loss of control of the vehicle, especially while moving at high rates of speed, or in restricted traffic zones such as tunnels, bridges, ramps, and the like where tire changes are not permitted.

The pneumatic tire manufacturing industry made numerous improvements to overcome the deficiencies of pneumatic tires so that serviceability, dependability, useful life and safety of such tires, especially for use on automobiles, were greatly increased. Along with improvements in the tires themselves, including development of the tubeless tire, came proposals for structures and devices of various kinds that provided full support or emergency support for the wheel and the pneumatic tire in the event that normal air pressure was lost. The purpose of these devices was to minimize inconvenience to the operator and to prevent loss of control of the moving vehicle, to prevent excessive damage to the tire, and in some instances, to eliminate the necessity for carrying a spare tire and tools for making an emergency tire change on the highway.

Among the emergency devices proposed were a number of fillers or inserts intended to be mounted inside a tire to provide full or temporary support for the tire and wheel of a vehicle. For the most part, these emergency supports we composed of rubber, both solid and foamed, and certain plastics. Recently, plastic fillers such as foamed polyurethane have been proposed as emergency supports for tubeless pneumatic tires. However, due to the rigorous conditions, particularly of temperature and pressure to which the emergency supports were subjected when put into service, they were not satisfactory. In fact, there is no known suitable foamed plastic emergency support for permanent installation within a tire that functions effectively as an emergency support, or safety device, for a pneumatic tire. The high temperatures generated in tires during normal driving of an automobile, for example, cause deterioration or softening of the previously known foamed plastics such that the plastic emergency support does not have adequate strength to carry the weight of the vehicle when air pressure fails. Hence, the general problem of providing a strong, lightweight, effective and acceptable emergency support structure for use with pneumatic tires, particularly tubeless motor vehicle tires, remains.

SUMMARY OF THE INVENTION

The present invention provides an emergency support for use with a tubeless pneumatic tire which comprises an annular polylactam body positioned about and in contact with a wheel rim and enclosed within said tire and spaced from the side walls and tread wall portion of said tire, means for mounting said annular polylactam body on the rim, said annular polylactam body comprising foamed polylactam having closed cells and a tensile strength expressed by the formula $S_t \geq 20d^{1.45}$ where in $S_t$ represents tensile strength, and $d$ represents density and has a value of about from 3 to 15 pounds per cubic foot, said polylactam body being adapted to support said wheel rim and tire when the tire is deflated. The density, represented by $d$ in the preceding formula, is determined by taking several random representative thin slices, e.g. 15 mils thick, of foamed polylactam cut in a direction parallel to the direction that the polylactam was ejected from the mold cavity and, if possible, each slice being taken from an area substantially equidistant from the surface. The density of each of the selected samples is measured, all of which have densities between 3 and 15 pounds per cubic foot, and tensile strength determined. The precise tensile strength measurement can be made in an Instron Tester where the samples can be stretched at 0.5 inch per minute. There can be, and usually is, some variation in the density of each sample depending on the particular location of that sample in the polylactam body because the foamed portion nearer the surface generally has a higher density. Preferably, the polylactam body that completely encircles the wheel rim is foamed polycaprolactam. Best results are achieved when the average density of the foamed polylactam, e.g. the density of a complete cross-sectional piece of polylactam, is between 5 and 9 pounds per cubic foot. In general, the foamed polylactam has a higher density skin, i.e., an outer cellular layer, integral with a lower density foamed inner portion. The higher density skin is advantageous because it provides a tough abrasion-resistant surface on the polylactam. The annular polylactam body positioned about and in contact with a wheel rim is mounted thereon by any suitable means. For example, the annular polylactam support can be mounted on the rim by interfitting means to secure one end to another; or the polylactam body can be mounted on the rim with adhesives that have good high temperature properties such as synthetic elastomer-based adhesives, e.g. EC 1711, or flexibilized epoxy adhesives, e.g. EC 2216, both manufactured by Minnesota Mining and Manufacturing Company. A tension member encircling the periphery of the annular polylactam support can also be used to mount said support on the rim. Tension means can be a binder or a closed loop sling, for example, of a polyester or polyamide rope; nylon strap also has been found to be particularly suitable for this purpose. The foamed polylactam support can be a unitary structure or it can be composed of a multiplicity of segments, usually two and generally not more than twelve segments. In any case, said segments can be adhesively secured together for mounting or they can be held in place by tension means.

The annular polylactam support structure is prepared by rapid anionic polymerization of monomeric lactam, for example, caprolactam or mixtures of lactams especially those containing three to twelve carbon atoms in the lactam ring. The process for making foamed polylactams used in the invention comprises adding gaseous foaming agent under pressure to molten lactam containing lactam-base salt, i.e. an anionic polymerization catalyst; also adding gaseous foaming agent under pressure to a separate portion of lactam containing polymerization promoter, i.e. cocatalyst; then bringing the two portions of lactam together into a mold cavity and polymerizing under pressure at least sufficient to maintain the foaming agent in the resulting polylactam. After said lactam is substantially polymerized, the pressure on the polylactam is rapidly reduced by opening an exit port of the mold cavity thus ejecting the shaped, substantially solid polylactam containing foaming agent out of the mold cavity into an area of lower pressure where solid-state expansion and foaming occur. The foamed polylactam support can be formed in an annular shape in the mold cavity or the foamed polylactam can be postformed into an annular shape after polymerization, foaming and expansion are complete.

The present invention provides an effective emergency support for use inside a mounted conventional tubeless pneumatic tire. The support is light, does not interfere with balancing the vehicle tire and wheel, and is exceptionally strong and tough even at the high temperatures to which it is exposed under driving conditions. The emergency support does not fracture under impact created by contact of the tire with the support when the tire passes over sharp irregularities in the road surface. Furthermore, the support prevents complete collapse of the tire and carries the weight of the vehicle previously carried by the tire when tire deflation occurs. The emergency support can be installed inside the tire with relative ease, it is moderate in cost, has long life, and permits a vehicle with a tire containing such emergency support to be controlled in case of tire deflation even at high vehicle speeds. The vehicle can be driven a considerable distance without destroying the tire or the support and without damaging the rim until the deflated tire can conveniently and safely be replaced.

BRIEF DESCRIPTION OF DRAWING

FIGURE 1 is a cross section of an inflated tubeless pneumatic tire with the emergency support of the present invention mounted on the rim; and FIGURE 2 is a modified side view, at 90° from the view of FIGURE 1, showing partially in cutaway perspective, an enlarged portion of the emergency support, tire wheel rim and wheel.

PREFERRED EMBODIMENTS

Referring now more particularly to the drawing, FIGURES 1 and 2 show a conventional tubeless tire 1 mounted on wheel rim 2 and secured by means of tire bead 3. Positioned about and in contact with the wheel rim and enclosed within said tire and spaced from side walls 4 and tread wall portion 5 of said tire is annular foamed polylactam body 6. Polylactam body 6 is preferably, but not necessarily, spaced from tire bead 3, as shown in the drawing. The annular foamed polylactam has a tensile strength expressed by the formula $S_t \geq 20d^{1.45}$ wherein $S_t$ represents tensile strength, and $d$ represents density and has a value of about from 3 to 15 pounds per cubic foot. The foamed polylactam is composed predominantly of closed cells, e.g. more than fifty percent, and preferably the annular polylactam body 6 has a higher density surface skin 7 integral with a lower density foamed inner portion 8. The higher density surface skin improves the abrasion resistance and load bearing properties of polylactam body 6. Rim 2 is provided with a conventional air valve 9 and wheel disk 10 supports rim 2. Mounting means represented by tension member 12 is positioned in groove 13 about the periphery of annular polylactam body 6.

FIGURE 2 also illustrates a modification of the invention showing a portion of annular polylactam body 6 in a multiplicity of segments 6a and 6b wherein said segments are interlocked by tongue-and-groove joint 11 thereby being mounted on and secured to rim 2.

The foamed annular polylactam support was made by a pressurized rapid anionic polymerization procedure. Using caprolactam as the lactam monomer, the procedure involved dispersing a slurry of sodium hydride in oil in molten caprolactam in an amount sufficient to obtain a 3 mol percent solution of sodium lactam. Sufficient potassium stearate (nucleating and mold-release agent) was added and dissolved to make a 6% (by weight) solution. The resulting catalyzed molten monomer was delivered into the top of a heated vessel containing gaseous butane pressurized at 150 pounds/sq. in. The temperature of the catalyzed mixture was about 130° C. A separate portion of an equal amount of caprolactam was heated and mixed with 0.6 percent of the cocatalyst poly [2,2 - propane - bis(4 - phenylene) - carbonate], and the molten mixture was similarly injected into a second heated vessel containing gaseous butane, the foaming agent, also pressurized at 150 pounds/sq. in. The temperature of the cocatalyzed mixture was about 160° C. The resulting catalyzed and cocatalyzed molten monomer compositions containing foaming agent were delivered at equal rates into a mixing zone immediately external to the mold, and the resulting polymerizable mixture was fed into a prepressurized mold cavity. The cylindrical mold cavity was prepressurized with gaseous nitrogen at 900 pounds/sq. in. The nitrogen pressure was held constant during the filling step by releasing excess nitrogen to an adjoining ballast vessel. The nitrogen pressure was adjusted so as to hold the volume of the liquid constant during the ensuing polymerization which was accompanied by a rise in temperature, the maximum temperature being reached in about 45 seconds. Leveling off of temperature indicated that polymerization was substantially complete. The exit port of the mold was opened after about three minutes from the time of delivery of the lactam mixture to the mold cavity, that is after substantially completing polymerization of the lactam composition. The solid polycaprolactam was ejected rapidly from the mold cavity into an area of atmospheric pressure where solid-state expansion and cell formation occurred. A higher density foamed skin was formed integral with a lower density foamed inner portion. The foamed polylactam body ejected from the mold cavity was then formed into a predetermined shape suitable for the emergency support. This was accomplished by placing the cellular polylactam piece into a ring-shaped postforming mold of the desired diameter just after ejection from the mold cavity and holding the foamed polylactam in the mold until the surface of the foamed polylactam cooled below about 50° C. Then, the postforming mold was opened, the curved section of foamed polycaprolactam was removed and cut into segments of predetermined length. The density of the random selected slices of the foamed polylactam was between 3 and 15 pounds per cubic foot, and the average density of a cross-sectional piece of the polycaprolactam was between 5 and 9 pounds per cubic foot. The diameter of the postforming mold was such that the annular polylactam body formed in the mold fitted closely onto the wheel rim with which it was to be used. The cross section of the annular polylactam body 6 can be of any design, preferably it has a substantially rectangular or trapezoidal cross section.

As mentioned above, the annular polylactam body positioned about the rim can be mounted thereon by various means. For example, interfitting means to secure one end, or segmented portion, to another, e.g. tongue-and-groove; it can be adhesively mounted on the rim; or it can be held in place by means of a tension member such as elastic polyester rope encircling the periphery of foamed annular polylactam body 6. Best results are obtained when tension member 12 is placed in groove 13 formed, preferably during polymerization, and loacated on the outer periphery of the foamed polylactam support. However, a circumferential band of flat or coiled metal spring or flat steel, a fiber band, or a spring-loaded plastic retention band is an alternative and satisfactory means for mounting the annular polylactam support member in place on the wheel rim A circumferential groove located on the outer periphery of the annular polylactam support member can be formed when the mold cavity of the reactor vessel is provided with such an insert. Under such conditions, the groove is likewise lined with a high density surface layer of skin which is contiguous with the skin covering the remainder of the foamed annular polylactam body and integral with the inner foamed portion. However, a groove also may be produced by machining the foamed polylactam, but in such case there is no high density skin on the surface of the groove. In any event, a tension member is provided that is placed in the groove in order to mount the annular polylactam support on the wheel rim and to secure segmented sections, if any, together.

Although caprolactam is represented above as the lactam monomer that is polymerized to foamed polylactam, any lactam or mixture of lactams having 3 to 12 carbon atoms in the lactam ring can be used to make the foamed polylactam emergency support. Representative polylactams that can be used as the emergency support are polypyrrolidone, polycaprolactam, polydecanolactam and polylaurolactam.

Since the small inner diameter of the annular foamed polylactam support structure of this invention is less than the diameter of the outermost portion of the rim of the wheel, the support is cut through in at least one place to form a one-segment support which can be positioned on the dropped center portion of the wheel rim with only slight distoration of the singly jointed emergency support. However, if desired, said annular polylactam support can be cut into two or more segments to facilitate assembly of the support on the rim of the wheel. Generally, the emergency support does not have more than about twelve segments or usually not more than four. These segments can be, for example, adhesively secured together, held together by interfitting the segments or by a tension member encircling the periphery of the annular polylactam body. The annular foamed polylactam body 6 is spaced from side walls 4 and tread wall portion 5 but, as mentioned above, can be in contact with bead 3 of tire 1.

The emergency support can be installed by placing a vehicle wheel and rim in a horizontal position in the usual tire-mounting equipment. The lower bead of the tire is forced over the upper bead-holding portion of the rim. The upper bead of the tire is lifted by a spreader which holds the beads apart and provides an opening through which the emergency support is placed inside the pneumatic tire. The upper tire bead is forced over the upper edge of the rim, and the tire is inflated by admitting air through the valve until both tire beads are firmly seated in position on the rim. Air pressure is released, the upper bead is lifted off the rim held by the spreader while, for example, a circumferential binder, e.g. an elastic closed loop polyester rope sling or other tension means, is snapped in place in a circumferential groove about the emergency support to mount the polylactam body on the wheel rim. Finally, the upper tire bead is again forced over the upper edge of the wheel rim and the tire is inflated through the air valve in the conventional manner to the recommended operating air pressure.

The riding quality of the tire is little changed by including an emergency support structure of this invention since the load on the inflated tire is supported by air under normal inflating pressure. The foamed polylactam support structure is light in weight and is uniformly distributed about the rim of the wheel, and therefore does not interfere with balancing of the wheel after mounting a tire containing an emergency support structure. It has been ascertained that heat buildup and temperature increase are not appreciably greater than in an identical tire operating without a polylactam emergency support. In this respect, among others, the emergency support of this invention is markedly superior to foamed compositions heretofore used to fill tires, or to fill a large portion of the enclosed volume adjacent to the tread wall and sidewalls of the tire, which rapidly generated heat during constant flexing of the tire and foam filler when the tire was rotated under load.

What is claimed is:

1. An emergency support for use with a tubeless pneumatic tire which comprises an annular polylactam body positioned about and in contact with a wheel rim and enclosed within said tire and spaced from the side walls and tread wall portion of said tire, means for mounting said annular polylactam body on the rim, said annular polylactam body comprising foamed polylactam having closed cells and a tensile strength expressed by the formula $S_t \geq 20d^{1.45}$ wherein $S_t$ represents tensile strength, and $d$ represents density and has a value of about from 3 to 15 pounds per cubic foot, said polylactam body being adapted to support said wheel rim and tire when the tire is deflated.

2. An article of claim 1 wherein the annular polylactam body is foamed polycaprolactam.

3. An article of claim 2 wherein the annular polycaprolactam body comprises a higher density foamed skin integral with a lower density foamed inner portion.

4. An article of claim 2 wherein the foamed polycaprolactam has an average density from 5 to 9 pounds per cubic foot.

5. An article of claim 2 wherein the annular polycaprolactam body is composed of a multiplicity of segments.

6. An article of claim 5 wherein the foamed polycaprolactam has an average density about from 5 to 9 pounds per cubic foot.

References Cited

UNITED STATES PATENTS

| 3,049,162 | 8/1962 | Rosenbaum et al. | 152—158 |
| 3,195,601 | 7/1965 | Travers | 152—158 |

ARTHUR L. LA POINT, Primary Examiner

CHARLES B. LYON, Assistant Examiner

U.S. Cl. X.R.

260—2.5